United States Patent Office 3,494,224
Patented Feb. 10, 1970

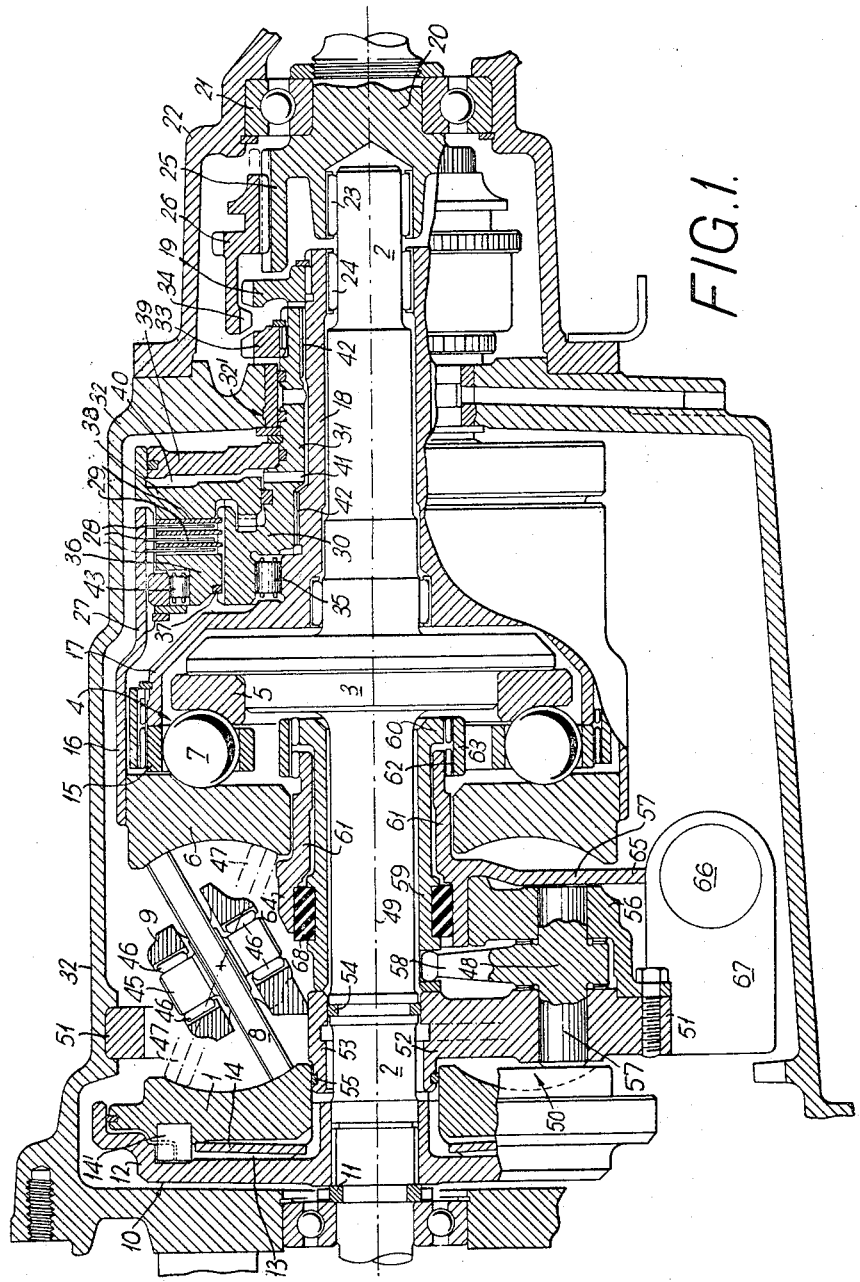

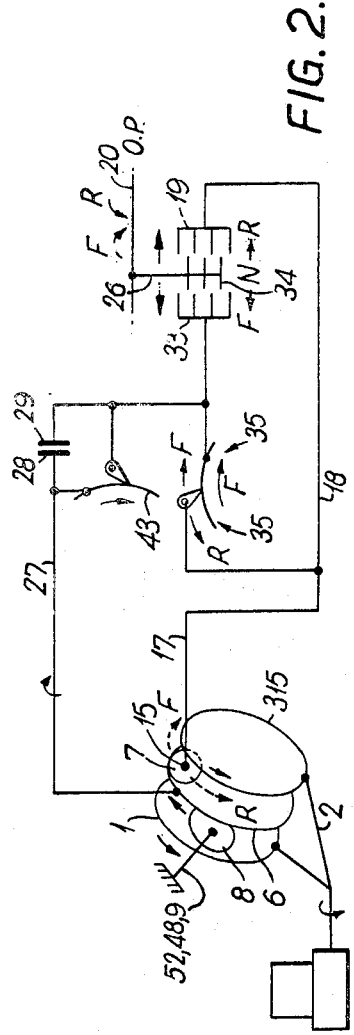

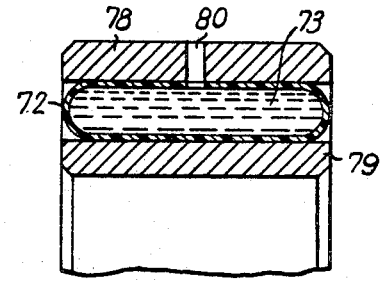
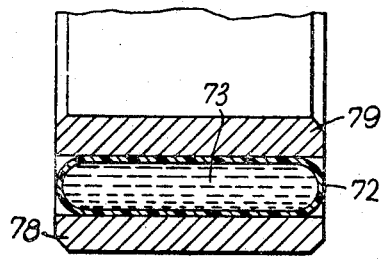
FIG. 4.
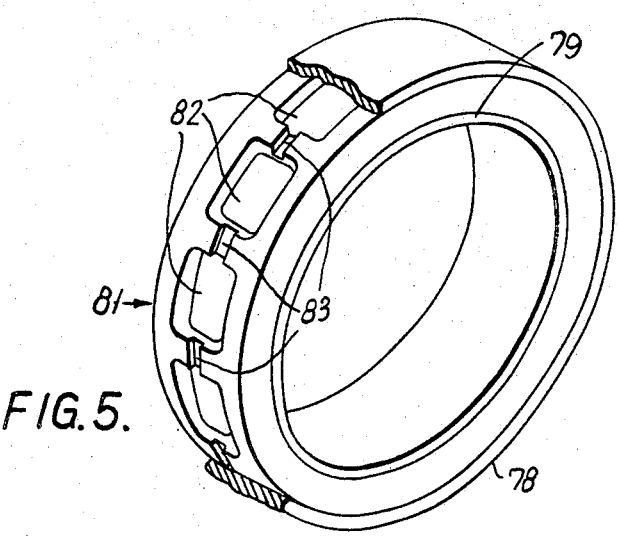
FIG. 5.

3,494,224
INFINITELY VARIABLE TRANSMISSION SYSTEM
Thomas George Fellows, Barnet, and Forbes George De Brie Perry, East Grinstead, England, assignors to National Research Development Corporation, London, England, a British corporation
Filed June 17, 1968, Ser. No. 737,584
Claims priority, application Great Britain, June 30, 1967, 30,376/67
Int. Cl. F16h 15/50, 37/06
U.S. Cl. 74—691
15 Claims

ABSTRACT OF THE DISCLOSURE

An infinitely variable transmission having two ranges (or regimes) of speed. The first regime is effected through two power paths to a planetary gear with an infinitely variable friction drive in one of the power paths. The second regime is provided solely by the friction drive. The power path of the first regime may include a unidirectional clutch with dogs to short circuit it for "reverse." The friction drive is of the toroidal race type with two contra-rotating discs coupled by rollers swingable to change the ratio. An end load device forces the discs against the rollers through a ball bearing with races respectively coupled rotationally to the two discs. The balls are caged and the bearing acts as the planetary gear train with the balls as planets and the cage as planet carrier. A flexible sheath filled with the silicone putty is inserted in an annular space between a ratio control member for the roller (rotatable for ratio changing and radially displaceable for inter-roller load equalisation), and a fixed part, to damp differential ratio change oscillations of the rollers.

---

This invention relates to a transmission system for a vehicle, using a continuously variable transmission unit of the so-called rolling friction type. In the specification of United Kingdom Patent No. 1,078,791 there is described a transmission system of this general type in which a steplessly variable transmission unit is coupled between a prime mover and the final drive in a manner whereby in a first regime the input shaft and output shaft of the transmission unit are coupled to two elements of a three element planetary gear train, the third element being connected to the final drive of the vehicle, the arrangement of the planetary gear train being such that for a predetermined ratio of the variable unit (called for convenience the "neutral ratio"), its input shaft and output shaft may rotate without transmitting rotation to the final drive of he vehicle, a variation of the ratio of the variable unit in one direction producing a range of forward ratios for the vehicle and a variation of the ratio of the variable unit in the other direction providing a range of reverse ratios for the vehicle. In a second regime the output of the variable unit is coupled directly to the final drive of the vehicle.

Two forms of the invention, the subject of United Kingdom Patent No. 1,078,791, are described in the specification. According to the first form, to raise the overall ratio in the first regime, for the same direction of rotation of the final drive of the vehicle as obtained in the second regime, the ratio of the variable unit is lowered and when the lower end of the ratio range of the variable unit is approached a point is reached where the ratio of the variable unit is equal to the overall ratio of the system, enabling the second regime to be clutched in before releasing the first regime, and vice versa when the overall ratio is being changed downwards from the second regime to the first. According to a second form of the invention of United Kingdom Patent No. 1,078,791, to raise the overall ratio in the first regime, for the same direction of rotation of the final drive of the vehicle as obtained in the second regime, the ratio of the variable unit is raised so that, on engagement of the second regime, the ratio of the variable unit has to be swept back from the upper end of its ratio range to the lower end to achieve a synchronous change into the second regime. On changing out of the second regime into the first regime a corresponding sweep of the ratio range of the variable unit in the opposite sense is required.

The present invention is concerned with improvements of and modifications to the second form of the invention which is the subject of United Kingdom Patent No. 1,078,791.

The specification of the said United Kingdom patent describes a variable unit of the type having two spaced-apart input discs, with facing toroidal surfaces, coupled to rotate together, and an output disc, between the input discs having a toroidal surface on both sides of it. Two sets of rollers provide driving connections between the surfaces of the input discs and the two surfaces of the output disc respectively. The planetary train has toothed gearing. It is an advantage of such a variable unit that the end load force urging the discs into driving engagement with the rollers can be applied between the two input discs which rotate together without the need for a thrust bearing but it is a disadvantage that two sets of rollers and roller mountings are required, which is costly.

Where only a single input disc and a single output disc are used, coupled by only a single set of rollers, the cost is reduced but a thrust bearing has to be employed to apply the end load force to the two contra-rotating discs. This bearing involves losses comparable with one of the sets of rollers of the said arrangement having two input discs, without contributing to the load carrying capacity of the variable unit.

The present invention offsets the losses in the thrust bearing by making the latter perform the functions of the planetary gear train of United Kingdom Patent No. 1,078,791.

According to its principle aspect, the present invention provides a transmission system for a vehicle comprising a steplessly variable ratio transmission unit of the so-called rolling friction type having an input disc and a coaxial output disc each with a toroidal surface facing the other, at least one roller contacting the toroidal surfaces and providing a driving connection between the discs, a mounting for the or each roller permitting tilting thereof to change the ratio of the transmission unit, means for providing a force urging the two discs together and into driving engagement with the or each roller, a ball bearing operatively located between the input disc and the output disc through which the said force is transmitted from one disc to the other, a cage for the balls of the ball bearing means for selectively coupling the said cage to the final drive of the vehicle or leaving the said cage uncoupled and free to rotate idly with the balls of the ball bearing and means for alternatively, respectively, disconnecting or connecting the output disc from or to the final drive of the vehicle.

Preferably the ball bearing is of the type in which the rotational axes of the balls are inclined to the common main rotational axis of the discs by an angle other than 90° as this overcomes a disadvantage of bearings of the pure thrust type that small misalignment of the two races causes accelerated wear.

It is convenient in the content of a transmission system for a road vehicle, that the diameter of the track engaged by the balls on the race which revolves with the output discs should exceed the diameter of the track engaged by the balls on the other race of the bearing, as this gives a satisfactory ratio for the bearing in its roll as a planetary gear train. However this is not necessarily the case in other vehicle applications, for instance when a larger range of "reverse" ratios is required.

The invention will be more readily understood from the following description of an embodiment thereof illustrated in the accompanying drawings, in which:

FIGURE 1 is a longitudinal section of a transmission system according to the invention, FIGURE 2 is a schematic representation of the system, FIGURE 3 is a detailed drawing of an alternative form for a part of the transmission system of FIGURE 1, FIGURE 4 is a drawing of another alternative form of the part illustrated in FIGURE 3, and FIGURE 5 is a drawing of yet another alternative form of the said part.

In FIGURE 1, an input disc 1, having a toroidal face on the right of it, is supported for rotation upon and with a shaft 2. At the right-hand end of the shaft 2 there is a flange 3 which forms a support for a thrust bearing generally indicated at 4. The bearing has a race 5 mounted on the flange 3 and the other race is machined into the right-hand surface of an output toroidally surfaced disc 6. Balls 7 supply support for the disc 6 so that it rotates concentrically with disc 1 about the shaft 2 and the balls 7 also transmit the thrust forcing the disc 1 to the right and the disc 6 to the left, into driving engagement with a roller 8 mounted between them on a roller carrier 9. Roller 8 is one of three similar rollers, similarly mounted, which are equally spaced apart around the discs 1 and 6. The thrust in question is generated by a device indicated generally at 10 which will be described later. The device 10 is anchored to the shaft 2 by means of a stout split collar 11 and comprises a cylinder element 12 keyed or splined to the shaft 2 and having a cylindrical portion at its periphery which embraces the outer edge of disc 1 to make an annular hydraulic actuator. The space 13 between cylinder element 12 and disc 1 is filled with fluid under pressure by means to be described later. A conical spring 14 of the so-called "Belleville" type exerts a force to the right upon the disc 1 and a force to the left on the shaft 2 which is transmitted via the flange 3 and the ball race 4 as a leftward thrust against the disc 6. The spring 14 provides a pre-load to preserve engagement of the roller 8 against the discs 1 and 6 when there is no hydraulic pressure available in the system to energise the actuator 10. A series of dowels such as 14' engage disc 1 and element 12 so that the one is driven by the other, rotationally.

A cage 15 provides location for the balls 7 and at its outer periphery has splines which are engaged by an internally splined ring 16 which engages corresponding splines on the outer lip of a bell member 17. Bell member 17 is integral with a sleeve 18 extending to the right and at the right-hand extremity of the sleeve 18 there is an annular ring 19 secured by splines to the sleeve 18. The output shaft of the transmission system, which is adapted to be coupled to the final drive of the vehicle, is supported for rotation by means of a ball bearing 21, in the casing 22. A leftward extension of the output shaft 20 provides a steady bearing for the extended end of the shaft 2 by means of needle roller bearings 23. The shaft 2, thus steadied, provides in turn a steady bearing for the sleeve 18 by means of needle rollers 24. The leftward extension of the output shaft 20 also comprises an integral drum member 25 which is outwardly splined to engage a dog member 26, but with freedom of relative axial movement.

A drum 27 is castellated at its left-hand end to engage corresponding castellations on the periphery of disc 6. The drum 27 extends to the right from disc 6 enclosing the thrust bearing 4 and the bell member 17 and terminating on the right-hand end with internal splines which support clutch discs 28. These clutch discs are interleaved with other clutch discs 29 which are internally splined to a drum member 30, integral with a sleeve 31 extending to the right and fitting over the sleeve 18. An in-turned flange of the main casing 32 provides a steady bearing 32' for sleeve 31 about mid-way along its length. At the right-hand end of sleeve 31 there is an annular dog member 33 splined to sleeve 31 internally and having external dogs which line up with the dogs of the ring 19. The dog member 26 has internally directed dogs 34 which can engage the external dogs of either the dog member 33 or the ring 19.

The sleeve 18, which rotates with cage 15 of thrust bearing 4, is coupled to drum member 30 by means of an unidirectional clutch device or "sprag" 35 which locks items 15 and 30 together for one direction of relative rotation but permits free relative rotation in the other direction.

The clutch plates 28, 29 are sandwiched between on the one side a thrust ring 36, splined to drum 30 and located axially by a stout spring ring 37, and on the other side an annular presser 38 the outer rim of which is flanged to the right to form a cylinder housing an annular piston 39 which together form a pressure chamber 40 into which fluid under pressure can be introduced through a radial duct 41 from a space bounded by the outer surface of sleeve 18, the inner surface of sleeve 31 and two bearing bushes 42 between these surfaces.

Between drum 27 and thrust ring 36 there is another unidirectional clutch or sprag 43.

Balls 7 contact the raceway on the right-hand side of disc 6 at a slightly larger diameter than that of the track on race 5 so that when the latter (and disc 1 and flange 3) is rotating slightly faster than the former the ball cage 15 remains stationary. For this to be the case, the roller 8 must contact disc 1 at a slightly smaller diameter than that at which it contacts disc 6, that is to say the output (6) to input (1) ratio of the variable ratio transmission unit is slightly lower than 1:1 and this will be called the "neutral ratio" of the transmission unit.

Schematic FIGURE 2, which is self explanatory and in which reference numerals according to FIGURE 1 have been used for corresponding items, indicates the manner of operation of the transmission system.

When the transmission unit is in the neutral ratio, ball cage 15 is subjected to no torque. This provides a geared neutral condition for the system when dogs 34 are meshed with dogs 33 which occurs in the leftward or "Forward" position of sleeve 26, clutch 28, 29 being disengaged. If the ratio of the transmission unit is raised, disc 6 starts to revolve faster and the geared neutral condition of the system is departed from so that cage 5 starts to be driven in the same direction as, but more slowly than, disc 6. This direction is shown as being clockwise in FIGURE 2, disc 1 and flange 3 being rotated in the conventional direction of vehicle engine rotation, that is to say, anti-clockwise as viewed from the rear of the vehicle.

Sprag 35 is engaged in these conditions and drives the output shaft 20, through dogs 33 and 34 which are engaged. This, clockwise, rotation of shaft 20 drives the vehicle forwards.

The sprag 43 is oriented so that it does not drive in these conditions of the system.

To engage the second regime, space 40 is pressurised to engage clutch 28, 29 to establish a direct driving connection between disc 6 and (through dogs 33 and 34) the output shaft 20.

Initially this will tend to drive the output shaft 20 at a suddenly increased speed but the ratio of the variable unit is quickly lowered to a synchronous ratio at which the speed of disc 6 is the same as was the speed of cage 15 prior to the regime change. In the process of lowering the ratio of the variable unit, the speed of cage 15 is reduced and in consequence the relative rotation of the two parts of sprag 35 is in the non-engaging direction but there is now a direct connection from disc 6 to output shaft 20 through clutch 28, 29 and dogs 33, 34 so that the overall ratio range of the transmission system is extended by the full ratio range of the variable unit. When a downwards regime change takes place, it is only necessary to release clutch 28, 29 at some point near to the low-ratio end of the ratio range of the variable unit and then sweep the ratio of the variable unit back in the direction of the high ratio end of the range until the speed of cage 15 catches up with the speed of the output shaft 20 so that sprag 35 engages.

In the geared neutral condition in the first regime, it is necessary to change the ratio of the variable unit from the neutral ratio. A change in one direction drives the vehicle forwards and a change in the other direction drives the vehicle in reverse. These changes of ratio of the variable unit will normally be automatic, the driver having general control through a demand member preferably linked to the engine fuel supply control (e.g. the throttle in the case of a petrol engine). To enable the driver to ensure that the vehicle moves forwards and not in reverse (or vice versa), according to his requirements, some form of pre-selector control is provided to change the sense of interaction between the demand member and the ratio controlling member of the variable unit. This pre-selector is also required to provide an alternative connection to sprag 35 when reverse is required, since the direction of relative rotation of its parts is in the non-engaging direction when cage 15 rotates anti-clockwise. For this purpose sleeve 34 is linked to the pre-selector control so that dogs 34 and 19 are engaged when "Reverse" is preselected.

Conveniently the pre-selector has a "Neutral" position which, in addition to performing certain functions upon the ratio control system for the variable unit, moves sleeve 26 to the mid-position in FIGURE 1, in which dogs 34 are not in engagement with dogs 33 or 19. The output shaft is then disconnected from the rest of the transmission system, enabling the vehicle to be towed.

It will be realized that the engagement of dogs 34 and 19 does not of itself change the directions of rotation of the rest of the transmission system, and were it not for the requirements of regime changing the dogs 34 and 19 could be used for both forward and reverse driving, with sprag 35 omitted. By the same token it could be arranged that dogs 34, 19 remained engaged both for slow forward driving as well as reverse, in conditions where rapid interchange between forward driving and reverse was required, e.g. for manoeuvering or extricating the vehicle from mud or snow. Preferably an additional preselector condition would be provided, by means of an additional control member marked "Manoeuvre" for instance, which would enable the preselector control to select the direction of ratio change from the neutral ratio as between "Reverse" and "Forward" but without changing over dogs 34, from engagement with dogs 19 to engagement with dogs 33. In the "manoeuvre," condition, engagement of clutch 28, 29 would be inhibited.

Under normal forward driving conditions, in the first regime, drive is transmitted through sprag 35 which does not transmit torque in the reverse sense, when the vehicle over-runs the engine for instance.

There is thus no "engine braking" in the first regime but as the overall ratios available in this regime will generally cover only the sort of range covered by the two lower gears of a conventional four-speed gear box, this lack of engine braking can be tolerated.

In the second regime the drive is transmitted positively through clutch 28, 29 so that there is "engine braking" on the over-run under normal conditions.

Where however the vehicle rolls forward with the engine idling or stopped, and where the clutch 28, 29 is energised by fluid pressure supplied from an engine-driven pump, there may be insufficient pressure to engage clutch 28, 29 so that "engine braking" would be lost in these conditions. Sprag 43 is provided to overcome this disadvantage. It transmits torque in the overrun direction even with clutch 28, 29 disengaged but as disc 6 is always revolving faster, in the clockwise sense, than cage 15, there is no interference with sprag 43 with the first regime conditions in the system.

The way in which the rollers, such as roller 8, are supported and caused to change their ratios, will now be described in relation to FIGURE 1.

Roller carrier 9 extends into and out of the paper, as seen in the top half of FIGURE 1 and terminates in trunnions defining the ratio axis of the roller about which it rotates substantially in the plane of the paper about an axis passing through the roller centre 44. An Axle pin 45, integral with the roller, rides in bearings 46 in the roller carrier 9 which define the rolling axis of the roller.

The roller 8, in FIGURE 1 is shown at one extreme end of its range of rotation about its ratio axis (the low ratio end) whereas the position it would occupy at the other (the high ratio end) of the range is indicated by the chain-dotted lines 47.

The trunnions at the ends of the roller carriers are carried in the outer ends of rocker levers one of which (associated with a roller, not shown, other than 8), is shown at 48. These rocker levers are so arranged that the roller carrier is translated laterally substantially along the ratio axis of the roller so that the roller can be displaced from an equilibrium ratio attitude in which its rolling axis intersects the main axis 49, common to shaft 2 and the discs 1 and 6, to an attitude in which the rolling axis of the roller does not intersect the main axis 49, whereupon the roller steers to another ratio attitude.

Details of a lay-out such as this contained in U.K. patent specification 979,062.

The rocker levers are pivoted at spaced-apart locations around a spider member, generally indicated at 50, which comprises an outer ring 51 secured to the main casing 32, three radial spider legs 52 (for a three-roller unit) and a central boss 53 which is sealed to the main shaft 2 and the inner bore of disc 1 by means of seals 54 and 55 respectively so that a clearance space around shaft 2, within boss 53, can serve as a gallery for the supply of hydraulic fluid into the end load cylinder space 13, via ducts in casing 32, and raidal oilways in ring 51 and spider legs 52.

Supplementary spider legs such as 56, are bolted or otherwise secured to ring 51 and each extends radially inwardly in a position parallel to one of the spider legs 52 so as to support at both ends the fulcrum pin such as 57 for one of the rockers 48.

Each rocker has a radially inwardly extending limb 58, the tip of which is received within a radial hole or slot in a common thrust receiving member 59 in the form of a sleeve, which passes through the centre of disc 6 and terminates in an externally splined flange 60 in the space within the ring of balls 7.

Surrounding the said sleeve of member 59 is another sleeve 61 which is separated from sleeve 59 and the central bore of disc 6 by clearances. Sleeve 61 also has an externally splined flange 62 adjacent to flange 60 of member 59 and the two sets of splines are coupled together by an internally splined collar 63. Sleeve 61 is free to rotate but is restrained from motion in other modes. Sleeve 59, on the other hand is required to rock, to permit the left-hand end, which receives the inner ends of the rocker arms 58, to move radially in any direction by a small amount thus enabling the rollers to make differential ratio changes to share equally between them torque passing through the variable unit. The manner in which this comes about is explained in detail in the said U.K. patent specification 979,062.

To enable sleeve 59 to rock, the splines of flanges 60 and 62 and collar 63 are suitably formed so as to provide a gimbal action whereby sleeves 59 and 61 are nevertheless positively coupled together with minimum backlash so far as relative rotation is concerned.

The left-hand end of sleeve 61 terminates in a portion 64 of larger internal and external diameter, the outside surface of which is supported at three equally spaced locations by arcuate inner ends of the supplementary spider arms such as 56. The right-hand end of enlargement 64 has an integral ratio control level 65 extending downwardly therefrom the lower end of which is coupled to the movable element of an hydraulic ratio actuator 66 which is not shown in detail but which may be similar to the actuator 136 of FIGURE 10 of the drawings accompanying the said specification of the said United Kingdom Patent No. 1,078,791. The body of actuator 66 is secured to ring 51 and casing 32 by means of a bracket 67. Actuator 66 acts via control level 65 to rotate sleeve 61 about main axis 49 and sleeve 59 rotates with it to initiate ratio changes on the part of the rollers by causing the rocker levers 48 to swing about their pivot pins 57.

In the specification of United Kingdom Patent No. 1,026,734 there is described means for damping radial oscillations of a common thrust receiving member such as sleeve 59 of FIGURE 1 by means of fluid-filled dashpots. It is proposed to provide damping similar in performance in the arrangement shown in FIGURE 1 by inserting a sleeve 68 of damping material between the enlargement 64 of sleeve 61 and the outer surface of sleeve 59. Preferably the sleeve 68 consists of a toroidal sheath of some suitable plastic film, the sheath being filled with an extremely viscous material such as a silicone putty of the type of which the resistance to deformation increases with the speed of deformation.

FIGURE 3 shows a particular construction for the damping device 68.

A sheet metal ring 69 of channel-shaped cross-section fits over sleeve 59 and is retained at one end by a shoulder 70 of sleeve 59 and at the other end by a spring 71 located in a groove in sleeve 59.

A toroidal sheath 72 filled with the appropriate viscous material 73 rests in the bottom of ring 69.

A strip of metal bent round into a hollow rectangular cross-sectional form is bent, as a whole, into a ring 74 so that it fits between the annular side walls 75 and 76 of ring 69 and rests upon the sheath 72.

Ring 74 may be welded together at its adjacent ends, and its adjacent edges may be left standing proud of the rectangular cross-sectional profile which it assumes when inserted within enlargement 64 of sleeve 61, so that they grip the bore of enlargement 64.

Ring 74 may be initially bent to a ring of larger diameter than that which it will assume when inserted into enlargement 64, so that it can be passed over side wall 76 before the complete assembly 64 is put into position between sleeve 59 and enlargement 64, in which case it will grip the latter without the need to leave its adjacent circumferential edges proud.

Alternatively side wall 76 of ring 69 may initially be slanted outwards to the left and then be bent to the position shown in FIGURE 3 after insertion of the fluid-filled sheath 72 and the ring 74.

An alternative form of damper 68 is shown in FIGURE 4. A thin ring 78 surrounding another thin ring 79 with an annular space between them into which the sheath 72 filled with viscous liquid 73 (as in FIGURE 3) is inserted and bonded to the inner surface of ring 78 and the outer surface of ring 79. The bonding restrains the liquid-filled sheath from spreading out axially except at the extreme edges which can only bulge out to the extent that this small section of the sheath is capable of stretching.

This damper unit is intended for insertion between members 59 and 64 (in FIGURE 1) as a prefabricated item. In the case where the bonding process cannot be carried out with the sheath filled with liquid, a hole 80 is provided in ring 78, which penetrates also through sheath 72, and liquid may be introduced within the sheath 72 through this hole after sheath 72 has been bonded to rings 78 and 79, the hole being then sealed off in any convenient manner.

FIGURE 5 shows a form of the damper 68 designed to give increased damping. Essentially it comprises narrow channels joining together pockets circumferentially disposed around the circumference of the damper.

It may be constructed from a strip moulding 81 having open pockets 82 interconnected by channels 83 which are narrower and shallower than the pockets. The open side of the moulding is bonded to a surrounding thin ring 78 which closes the open sides of the pockets and channels and the other side of the moulding is bonded to another thin ring 79 (as in FIGURE 4). A conveniently placed filling hole (such as 80 in FIGURE 4) may be provided. Moulding 81 may be moulded in the flat with the end pockets closed or it may be moulded in the round with a continuous ring of pockets and interconnecting channels.

Automatic control of the transmission system may be effected by means of a control system on the general lines of FIGURE 10 of the specification of the said United Kingdom Patent No. 1,078,791 but with the output pump and the pump shuttle valve, as shown in that specification, omitted and the dogs 33, 34, 19 controlled directly by mechanical linkages from the selector quadrant lever. There is, furthermore no need for the connection, shown in the said specification, from the Regime Shift Valve to the sprag dogs (corresponding to dogs 34, 19), which short circuit, a sprag, corresponding to sprag 34, through which the drive is transmitted in the "First Regime, Forward" condition of the system.

We claim:

1. A transmission system for a vehicle comprising a steplessly variable ratio transmission unit of the so-called rolling friction type having an input disc and a coaxial output disc each with a toroidal surface facing the other, at least one roller contacting the toroidal surfaces and providing a driving connection between the discs, a mounting for the or each roller permitting tilting thereof to change the ratio of the transmission unit, means for providing a force urging the two discs together and into driving engagement with the or each roller, a ball bearing operatively located between the input disc and the output disc through which the said force is transmitted from one disc to the other, a cage for the balls of the ball bearing, means for selectively coupling the said cage to the final drive of the vehicle or leaving the said cage uncoupled and free to rotate idly with the balls of the ball bearing and means for alternatively, respectively, disconnecting or connecting the output disc from or to the final drive of the vehicle.

2. A transmission system as claimed in claim 1 in which the said means for providing a force urging the two discs together comprises a main shaft to which the input disc is secured against relative rotation, the main shaft having a thrust abutment on the side of the output disc remote from the input disc, one race of the ball bearing being carried by the said abutment, the other race of the ball bearing being carried by the output disc on the side thereof opposite from its toroidally surfaced side the output disc obtaining radial location from the ball bearing.

3. A transmission system as claimed in claim 1 in which the means for selectively coupling the ball bearing cage to the final drive of the vehicle comprises a unidirectional clutch poled to transmit torque from the cage to the final drive in a predetermined direction of rotation of the latter which is the same direction as that in which it rotates when connected to the output disc.

4. A transmission system as claimed in claim 1 in which the means for disconnecting or connecting the output disc from or to the final drive of the vehicle is a fluid-pressure-operated friction clutch.

5. A transmission system as claimed in claim 3 with dog clutch means for directly connecting the cage of the ball bearing to the final drive of the vehicle whereby the latter may be rotated in the direction opposite to the said predetermined direction.

6. A transmission system as claimed in claim 5 with operating means for the dog clutch means and means associated with the operating means for disabling the means for connecting the output disc to the final drive of the vehicle when the dog clutch means is engaged.

7. A transmission system as claimed in claim 5 in which the dog clutch means has extra dogs and a movable member capable of three settings, a first setting in which the cage of the ball bearing is directly connected to the final drive of the vehicle in, a second setting in which the cage of the ball bearing is connected via the unidirectional clutch and the extra dogs, in series, to the final drive of the vehicle and a third setting in which the final drive of the vehicle is disconnected from the remainder of the transmission system.

8. A transmission system as claimed in claim 4 with a unidirectional clutch, bridging the said friction clutch and poled so as to transmit torque from the final drive of the vehicle to the output disc in a predetermined direction of rotation of the final drive which is the same as that in which it rotates when the friction clutch is engaged but not to transmit torque from the final drive to the output disc in the direction of rotation opposite to the predetermined direcion and not to transmit torque from the output disc to the final drive in the predetermined direction of rotation.

9. A transmission system as claimed in claim 1 with a plurality of rollers interconnecting the input disc and the output disc, the mountings of each of the rollers comprising a torque reaction responsive member permitting the rollers to move in a mode initiating a change of ratio under the influence of the driving torque reaction to which the rollers are subjected, the said members for the rollers being coupled to a common thrust-receiving member which is capable of rotation when the rollers move in unison to initiate a change of ratio, control force, application means coupled to the common thrust receiving member and opposing the torque reaction forces applied to the said common member by the said members of the roller mountings, the said common member being free to move to a limited extent in any direction radial of the common axis of the discs in response to the said forces applied to it by the members of the roller mountings permitting the rollers to change ratio differentially to equalise the torque reaction forces as between one roller and another and with means for damping the said radial motions of the said common member characterised in that the said damping means comprises internal and external generally cylindrical surfaces separated by an annular space one of such surfaces being formed upon the said common member the other of such surfaces being formed upon a part of the control force application means coupled to rotate with the said common member but with means for restraining the said part from radial motion in relation to the common rotational axis of the discs and a toroidal sheath of elastomeric material filled with a highly viscous fluid, the said tube occupying the said annular space.

10. A transmission system as claimed in claim 9 with flanges attached to and extending radially from one of the said surfaces by an amount insufficient to fill the said gap and with a pressure plate between the sheath and the other of the said surfaces such plate being accommodated between and located by the said flanges.

11. A transmission unit as claimed in claim 9 in which the said sheath is bonded to respective opposed surfaces of an inner ring and an outer ring adapted for insertion into the said annular space.

12. A transmission unit as claimed in claim 9 in which the space within the sheath comprises a plurality of pockets disposed circumferentially around the sheath and with passages of reduced cross-section interconnecting adjacent pockets.

13. A transmission system as claimed in claim 1 in which the axes about which the balls of the bearing revolve are inclined to the common main axis about which the discs revolve, by an angle other than 90°.

14. A transmission system as claimed in claim 1 in which the diameter of the track contacted by the balls of the bearing on the race which rotates with the output disc, exceeds the diameter of the track contacted by the balls, on the other race of the bearing.

15. A transmission system as claimed in claim 1 modified in this, that a roller bearing is substituted for the ball bearing.

References Cited

UNITED STATES PATENTS

| 1,999,544 | 4/1935 | Madle | 74—796 |
| 2,100,632 | 11/1937 | Chilton | 74—796 |
| 2,181,380 | 11/1939 | Pollard | 74—691 |
| 2,292,066 | 8/1942 | Erban | 74—796 X |
| 3,406,597 | 10/1968 | Perry et al. | 74—691 X |

DONLEY J. STOCKING, Primary Examiner

T. C. PERRY, Assistant Examiner

U.S. Cl. X.R.

74—796, 200, 208